United States Patent
Namba (10) Patent No.: US 11,504,986 B2
(45) Date of Patent: Nov. 22, 2022

(54) PRINTING DEVICE CONFIGURED TO SEPARATE SHEET INTO FIRST SHEET AND SECOND SHEET, DISCHARGE FIRST SHEET, AND REUSE SECOND SHEET

(71) Applicant: BROTHER KOGYO KABUSHIKI KAISHA, Nagoya (JP)

(72) Inventor: Mamoru Namba, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/216,806

(22) Filed: Mar. 30, 2021

(65) Prior Publication Data

US 2021/0300082 A1    Sep. 30, 2021

(30) Foreign Application Priority Data

Mar. 31, 2020   (JP) .............................. JP2020-064037

(51) Int. Cl.
B41J 11/66    (2006.01)

(52) U.S. Cl.
CPC ................................... B41J 11/663 (2013.01)

(58) Field of Classification Search
CPC .. B41J 13/009; B41J 13/0009; B41J 13/0036; B41J 13/0045; B41J 11/66; B41J 11/663
See application file for complete search history.

(56) References Cited

U.S. PATENT DOCUMENTS

| 2015/0002862 A1* | 1/2015 | Maeda .................. B41J 11/008 358/1.2 |
| 2015/0344258 A1* | 12/2015 | Tsumura ................ B65H 29/52 271/176 |
| 2019/0126646 A1* | 5/2019 | Takeda ................. B41J 2/04501 |
| 2020/0117405 A1* | 4/2020 | Sunami .................... G06F 13/00 |
| 2020/0317461 A1* | 10/2020 | Toyoizumi ............ B65H 35/04 |

FOREIGN PATENT DOCUMENTS

| JP | 2018-186448 A |   | 11/2018 |   |
| JP | 2020169088 A | * | 10/2020 | ............ B41J 11/663 |

OTHER PUBLICATIONS

Toyoizumi, MachineTranslationof2020169088A, 2020 (Year: 2020).*

* cited by examiner

*Primary Examiner* — Scott A Richmond
(74) *Attorney, Agent, or Firm* — Scully, Scott, Murphy & Presser, P.C.

(57) ABSTRACT

A printing device includes a first accommodating unit, an image-recording unit, a cutting unit, and a second accommodating unit. The first accommodating unit is configured to accommodate a printing medium therein. The printing medium is conveyed in a first conveying direction along a first conveying path. The cutting unit is configured to cut the printing medium to separate the printing medium into a first printing medium and a second printing medium. The second accommodating unit is configured to accommodate therein the second printing medium which has is produced by cutting the printing medium by the cutting unit. A length of the second accommodating unit in a printing medium conveying direction is shorter than a length of the first accommodating unit in the printing medium conveying direction. The second printing medium is conveyed to the second accommodating unit in a second conveying direction along a second conveying path.

19 Claims, 8 Drawing Sheets

PRINTING DEVICE CONFIGURED TO SEPARATE SHEET INTO FIRST SHEET AND SECOND SHEET, DISCHARGE FIRST SHEET, AND REUSE SECOND SHEET

CROSS REFERENCE TO RELATED APPLICATION

This application claims priority from Japanese Patent Application No. 2020-064037 filed Mar. 31, 2020. The entire content of the priority application is incorporated herein by reference.

TECHNICAL FIELD

The present disclosure relates to a printing device.

BACKGROUND

A conventional image forming apparatus is provided with an image forming unit for forming images on sheets, and a sheet conveying unit for conveying sheets to the image forming unit. When the image forming receives a job, the sheet conveying unit conveys a sheet in a sheet feeding cassette to the image forming unit, and the image forming unit forms an image on the sheet. At this time, the size of the sheet specified by the job may be smaller than the size of the sheets loaded in the sheet feeding cassette. In such cases, user must reload sheets having the size specified in the job, which is an inconvenience for the user.

Japanese Patent Application Publication No. 2018-186448 describes an image-forming device that forms images on second sheets having a larger size than first sheets specified in the print job when a first sheet-feeding cassette is out of the first sheets. After forming an image on a second sheet having a larger size than the first sheet, the conventional image-forming device cuts the second sheet in half to generate an image sheet and a blank sheet having the same size as the first sheet. The image-forming device then discharges the image sheet on which the image was formed into a first discharge tray and stores the blank sheet having no image formed thereon in the first sheet-feeding cassette. Thus, when a subsequent job specifies a sheet size equivalent to the size of the first sheet, the image-forming device can reuse the blank sheets accommodated in the first sheet-feeding cassette.

SUMMARY

However, in the above document, since the image-forming device is provided with two sheet feeding-cassettes of the same size, the image-forming device cannot be made more compact.

In view of the foregoing, it is an object of the present disclosure to provide a more compact printing device that can cut a printing medium and use the cut printing medium.

In order to attain the above and other objects, according to one aspect, the disclosure provides a printing device including a first accommodating unit, a first conveying path, an image-recording unit, a cutting unit, a second accommodating unit, and a second conveying path. The first accommodating unit is configured to accommodate a printing medium therein. The printing medium is conveyed in a first conveying direction along the first conveying path. The image-recording unit is disposed along the first conveying path and configured to record an image on the printing medium. The cutting unit is configured to cut the printing medium to separate the printing medium into a first printing medium and a second printing medium. The second accommodating unit is configured to accommodate therein the second printing medium which has is produced by cutting the printing medium by the cutting unit. A length of the second accommodating unit in a printing medium conveying direction is shorter than a length of the first accommodating unit in the printing medium conveying direction. The second printing medium is conveyed to the second accommodating unit in a second conveying direction along the second conveying path. The second conveying direction is different from the first conveying direction.

BRIEF DESCRIPTION OF THE DRAWINGS

The particular features and advantages of the disclosure will become apparent from the following description taken in connection with the accompanying drawings, in which.

DETAILED DESCRIPTION

First Embodiment

<Configuration of Printing Device>

Hereinafter, a printing device 1 according to a first embodiment of the present disclosure will be described with reference to FIGS. 1 through 6.

Figure 1:
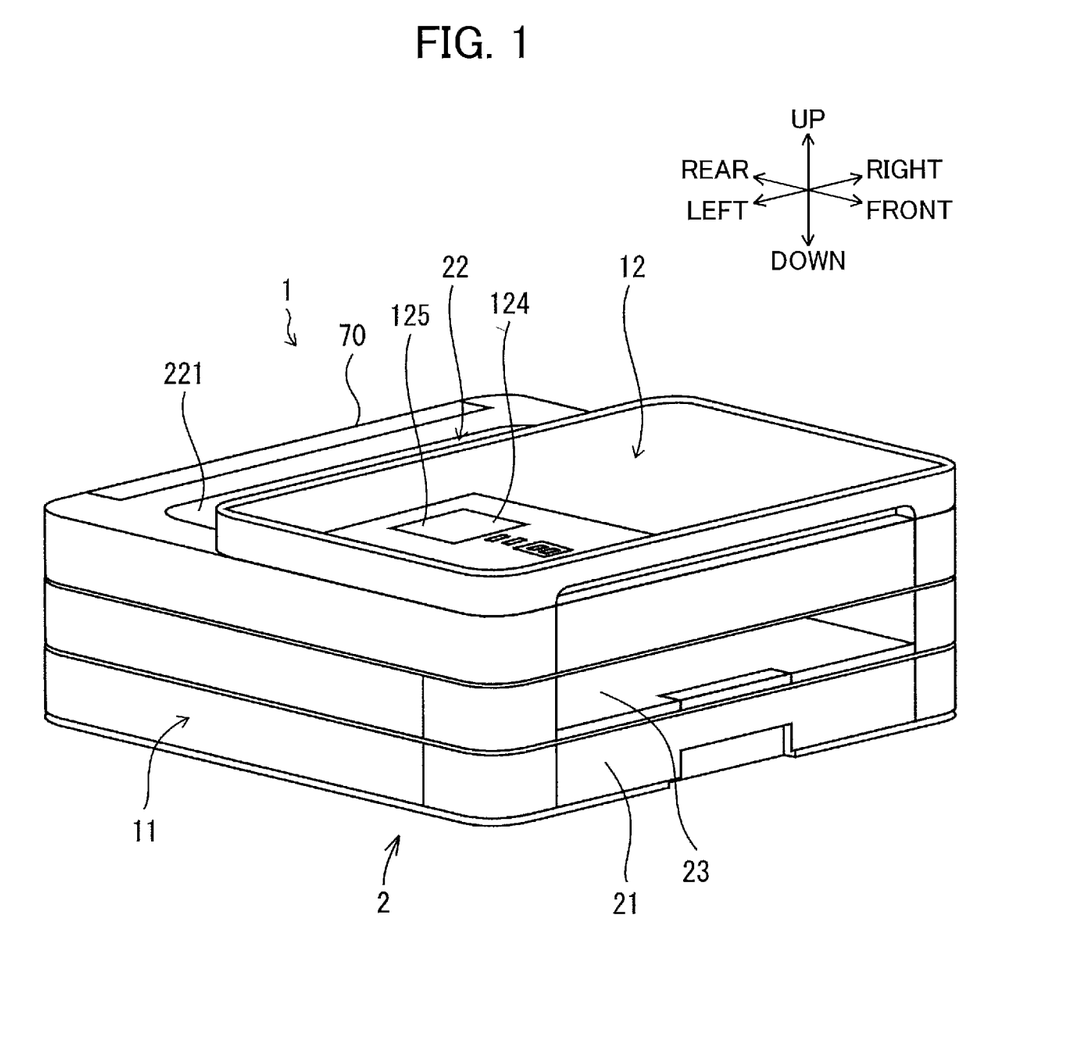
FIG. 1 is a view illustrating an external appearance of a printing device according to a first embodiment of the present disclosure.
Figure 2:
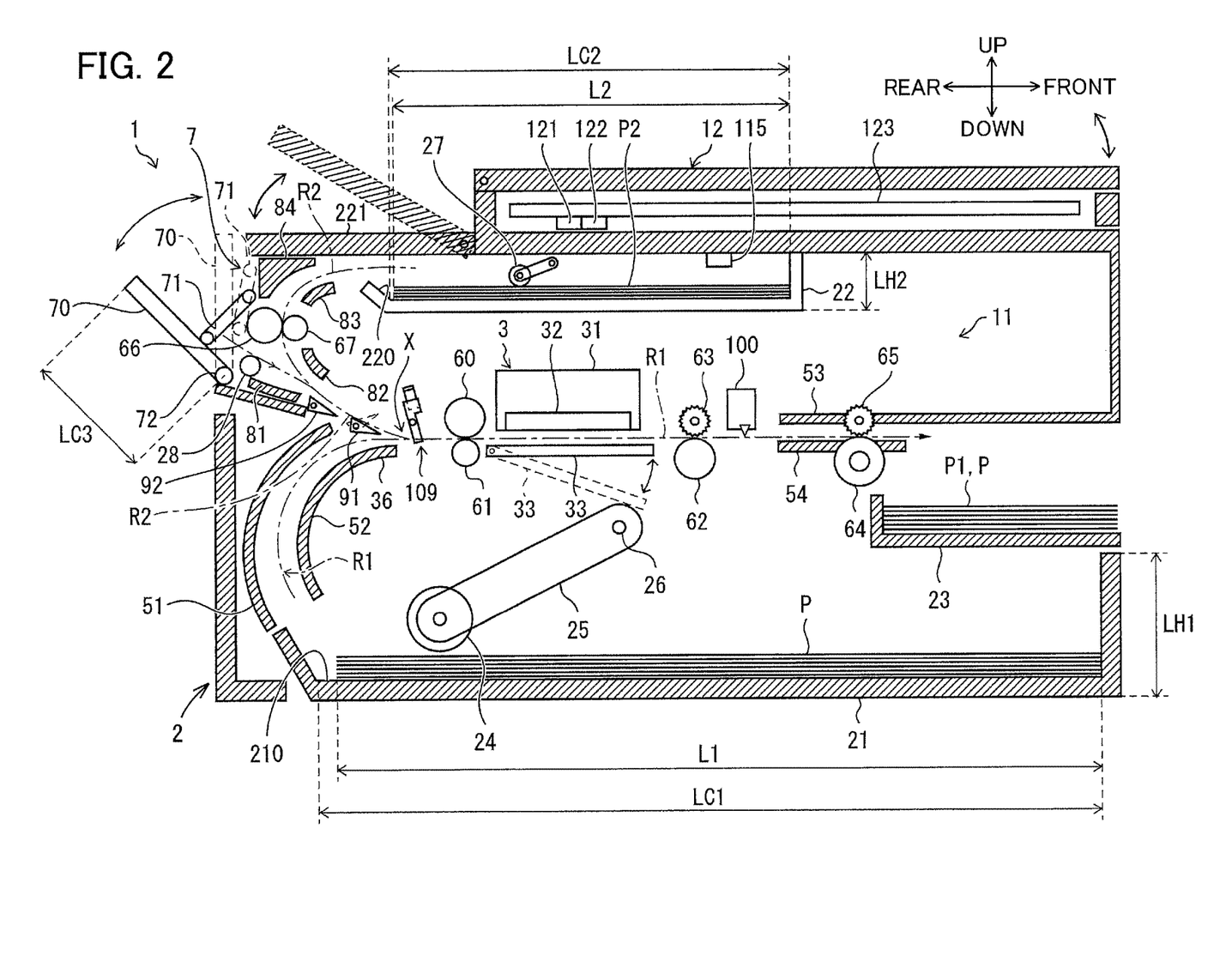
FIG. 2 is a cross-sectional view illustrating an internal configuration of the printing device according to the first embodiment.

As shown in FIGS. 1 and 2, the printing device 1 is a multifunction peripheral (MFP) including a casing 2 having substantially a rectangular shape. The printing device 1 including a printing unit 11 and an image-reading unit 12. The printing unit 11 has an inkjet printing function. The image-reading unit 12 has a scanning function. The image-reading unit 12 has an upper surface on which an operating unit 124, a display unit, and the like are provided. For convenience, an up-down direction, a left-right direction, and a front-rear direction with reference to the printing device 1 are defined as indicated by arrows in FIG. 1.

<Printing Unit>

The printing unit 11 has the inkjet printing function for recording print data specified in a print job on sheets P (an example of the printing medium) by ejecting ink, for example. However, method of printing is not limited to the inkjet method but may be the electrophotographic method.

The printing unit 11 may be capable of printing color images or only monochromatic images on sheets P.

As shown in FIGS. 1 and 2, the printing unit 11 has a first accommodating unit 21, a second accommodating unit 22, and a discharge unit 23. The first accommodating unit 21 is a case with an open top for accommodating sheets P. The first accommodating unit 21 has a first placement part 210 and accommodates sheets P supported on the first placement part 210. The sheets P are sheets in the A4 size, for example. The first accommodating unit 21 and discharge unit 23 are disposed in the printing unit 11 so as to be movable in the front-rear direction through an opening formed in the front surface of the printing unit 11. The printing medium used in the printing unit 11 may be a paper medium, such as the sheets P, or a resin medium, such as transparency sheets.

The second accommodating unit 22 is disposed in the rear section of the printing device 1 between an image-recording unit 3 (described later) and the image-reading unit 12. The second accommodating unit 22 is a case with an open top for accommodating second sheets P2 as an example of the second printing medium. The second accommodating unit 22 has a second placement part 220, and a cover 221. The second accommodating unit 22 accommodates second sheets P2 supported on the second placement part 220. By opening the cover 221 as depicted with dashed lines in FIG. 2, the user can retrieve second sheets P2 from the second accommodating unit 22.

The second accommodating unit 22 has a smaller size than the first accommodating unit 21. Specifically, if the length of the second accommodating unit 22 in the paper conveying direction (an example of the printing medium conveying direction) is defined as a length LC2 in the front-rear direction and the length of the first accommodating unit 21 in the paper conveying direction is defined as a length LC1 in the front-rear direction, the length LC2 is shorter than the length LC1. For example, the length LC2 is approximately half the length LC1 in the paper conveying direction of the first accommodating unit 21. Here, the length LC1 of the first accommodating unit 21 in the paper conveying direction is the distance from the front wall portion to the rear wall portion of the first accommodating unit 21. Similarly, the length LC2 of the second accommodating unit 22 in the paper conveying direction is the distance from the front wall portion to the rear wall portion of the second accommodating unit 22. Additionally, a vertical length LH2 of the second accommodating unit 22 is set shorter than a vertical length LH1 of the first accommodating unit 21. Note that the length LC2 of the second accommodating unit 22 in the front-rear direction may be modified as needed, provided that the length LC2 is shorter than a maximum size L for sheets P accommodated in the first accommodating unit 21.

The second sheets P2 accommodated in the second accommodating unit 22 are produced when sheets P are cut by a cutting unit 100 described later. The second sheets P2 have the A5 size, for example, and are smaller than the sheets P.

The printing unit 11 is further provided with a first feed roller 24, a first conveying path R1, a first conveying roller 60, an image-recording unit 3, a second conveying roller 62, a discharge roller 64, a third conveying roller 66, a second conveying path R2, a second feed roller 27, a third feed roller 28, a first flap 91, a second flap 92, and the cutting unit 100.

The first feed roller 24 functions to convey sheets P accommodated in the first accommodating unit 21 onto the first conveying path R1. The first feed roller 24 is rotatably supported on the distal end of a feed arm 25. The feed arm 25 is rotatably supported by a shaft 26, which in turn is supported in the casing 2 of the printing device 1. The feed arm 25 is urged to rotate toward the first accommodating unit 21 by its own weight or the elastic force of a spring or the like.

A feed motor 111 (see FIG. 3) drives the first feed roller 24 to rotate forward. By rotating forward, the first feed roller 24 feeds sheets P accommodated in the first accommodating unit 21 onto the first conveying path R1 one sheet at a time. A sheet P conveyed onto the first conveying path R1 is then conveyed in a first conveying direction, which is the direction from the rear toward the front of the printing unit 11.

The first conveying path R1 is a space defined by guide members 51, 52, 53 and 54, the image-recording unit 3, and the like. Specifically, the first conveying path R1 is a path that extends from a rear end of the first accommodating unit 21 toward the discharging unit 23. More specifically, the path extends upward from the rear end of the first accommodating unit 21, curving in a region defined by the guide members 51 and 52, and then extends straight past the position of the image-recording unit 3 and through a region defined by the guide members 53 and 54.

The conveying roller 60 is disposed upstream of the image-recording unit 3 in the first conveying direction. A pinch roller 61 is disposed at a position below and opposing the first conveying roller 60. A conveying motor (see FIG. 3) causes the first conveying roller 60 to be rotated. The pinch roller 61 is rotated following rotation of the first conveying roller 60. While a sheet P is nipped between the first conveying roller 60 and the pinch roller 61, forward rotation of the first conveying roller 60 and the pinch roller 61 causes the sheet P to be conveyed toward the image-recording unit 3.

The image-recording unit 3 is disposed along the first conveying path R1 between the first conveying roller 60 and the second conveying roller 62, and is configured to record images on sheets P. The image-recording unit 3 includes a carriage 31, a recording head 32, and a platen 33. The recording head 32 is mounted on the carriage 31. The recording head has a lower surface on which a plurality of nozzles is formed (not shown). The recording head is configured to eject ink droplets through the nozzles by vibrating a vibrating element such as a piezo element.

The platen 33 is a rectangular plate-shaped member that supports the sheets P as the sheets P are conveyed along the first conveying path R1 beneath the image-recording unit 3. The image-recording unit 3 records an image on a sheet P supported on the platen 33 by controlling the recording head 32 to eject ink droplets selectively through the nozzles when the carriage 31 is moved relative to the sheet P.

The platen 33 is disposed so as to be pivotable between a first position and a second position. In the first position, the platen 33 is parallel to the first conveying path R1. In the second position, the platen 33 is rotated downward a prescribed angle from the first position. The platen 33 is placed in the first position when a sheet P is being conveyed and printed. However, in the event of a paper jam or the like, the user places the platen 33 in the second position, establishing communication between an interior space of the casing 2 of the printing device 1 and an outside of the casing 2 of the printing device 1 through an opening 7 formed in the rear side of the printing device 1. This configuration provides easier access to the image-reading unit 3 through the opening 7. Accordingly, the user can perform an operation to remove a sheet P that has become jammed.

A carriage motor 113 (see FIG. 3) transmits a drive force to the carriage 31 for reciprocating the carriage 31 in directions orthogonal to the first conveying direction, i.e., in reciprocating directions along the width of the sheet P. When recording an image on a sheet P, a controller 10 of the printing unit 11 repeatedly alternates between executing a recording process to record an image for one line on the sheet P, and executing a line feed process to convey the sheet P a prescribed feed amount. In the recording process, the controller 10 moves the carriage 31 along the width direction of the sheet P while ejecting ink from the recording head 32. In the line feed process, the controller 10 drives the first conveying roller 60 and second conveying roller 62 to convey the sheet P the prescribed feed amount.

The second conveying roller 62 is disposed along the first conveying path R1 at a position downstream of the image-recording unit 3 in the first conveying direction. A spur roller 63 is disposed at a position above and confronting the second conveying roller 62. The conveying motor 112 (see FIG. 3) drives the second conveying roller 62 to rotate. The spur roller 63 rotates along with the rotation of the second conveying roller 62. When a sheet P is nipped between the second conveying roller 62 and spur roller 63, the forward rotation of the second conveying roller 62 and spur roller 63 convey the sheet P toward the cutting unit 100.

Figure 4:
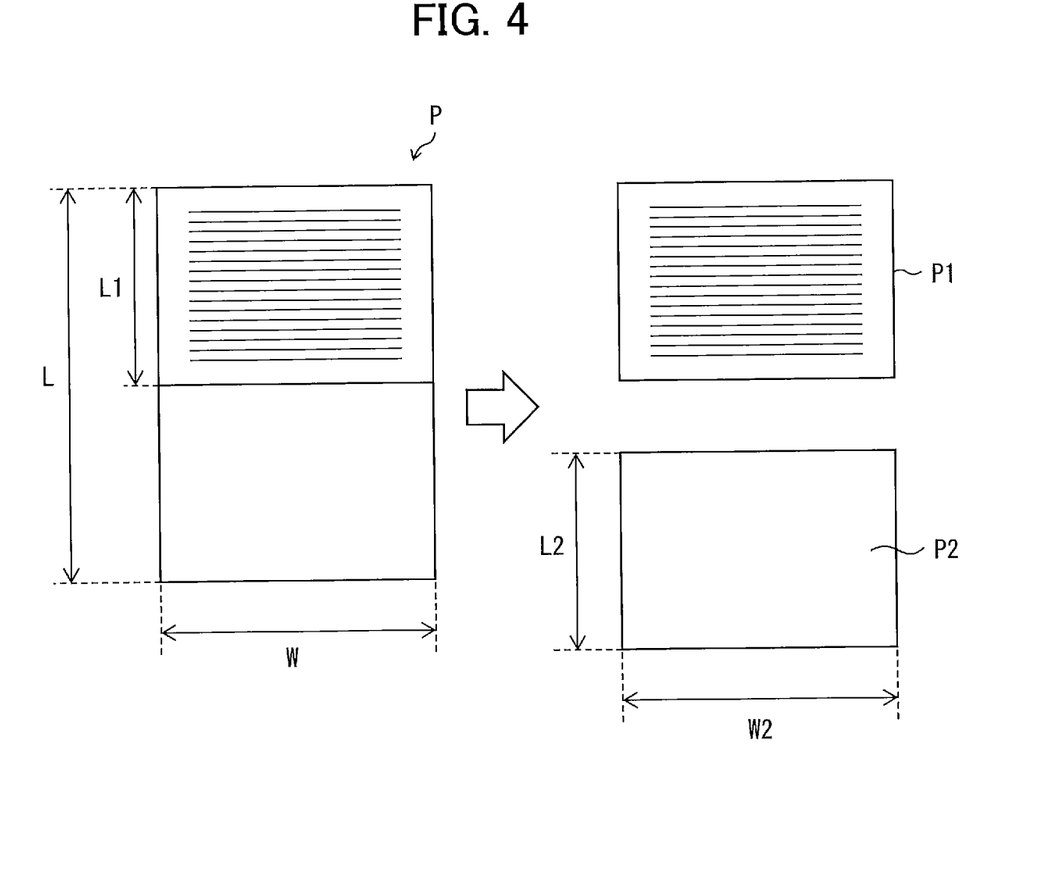
FIG. 4 is a view illustrating a sheet prior to cutting process, and first and second sheets obtained by cutting the sheet.

The cutting unit 100 is disposed along the first conveying path R1 downstream of the image-recording unit 3 and second conveying roller 62. The cutting unit 100 has a well-known cutter mechanism for cutting a sheet P after the image-recording unit 3 has recorded an image thereon. Specifically, while the sheet P is in a stationary state and nipped between the second conveying roller 62 and the spur roller 63 and between the discharge roller 64 and a spur roller 65 (described later), the cutting unit 100 is moved in the width direction of the sheet P to cut through the sheet P at a prescribed position. When the controller 10 determines that a sheet P must be cut, the controller 10 controls the cutting unit 100 to cut the sheet P at the prescribed position, separating the sheet P into a first sheet P1 and a second sheet P2 as shown in FIG. 4. The first sheet P1 is an example of the first printing medium. The second sheet P2 is an example of the second printing medium.

The discharge roller 64 is disposed along the first conveying path R1 on the downstream side of the cutting unit 100 in the first conveying direction. The spur roller 65 is disposed at a position above and confronting the discharge roller 64. The conveying motor 112 (see FIG. 3) drives the discharge roller 64 to rotate. The spur roller 65 rotates along with the rotation of the discharge roller 64. A sheet P or first sheet P1 nipped between the discharge roller 64 and spur roller 65 is discharged into the discharge unit 23 by the forward rotation of the discharge roller 64 and spur roller 65. As shown in FIG. 2, the discharge unit 23 is arranged above the first accommodating unit 21. The discharge unit 23 holds sheets P or first sheets P1 discharged by the discharge roller 64.

The second sheet P2 produced when the cutting unit 100 cuts a sheet P is conveyed onto the second conveying path R2 from a merging position X of the first conveying path R1 and second conveying path R2 and is stored in the second accommodating unit 22. The second conveying path R2 is the path for guiding a second sheet P2 conveyed in the second conveying direction to the second accommodating unit 22. The second conveying path R2 is defined by guide members 81, 82, 83, and 84; the first flap 91; the second flap 92; the third conveying roller 66; a pinch roller 67; and the like.

The feed motor 111 (see FIG. 3) drives the second feed roller 27 to rotate forward. By rotating forward, the second feed roller 27 conveys the second sheets P2 accommodated in the second accommodating unit 22 onto the second conveying path R2 one sheet at a time. A second sheet P2 fed onto the second conveying path R2 is conveyed to the image-recording unit 3 through the first conveying path R1.

The first flap 91 and second flap 92 are provided on the second conveying path R2 between the merging position X and the guide member 81. The first flap 91 is urged downward by a coil spring (not shown) and is provided to be rotatable between a first state depicted by dashed lines in FIG. 2, and a second state depicted by solid lines in FIG. 2. The first flap 91 configures part of the first conveying path R1 when in the first state and configures part of the second conveying path R2 when in the second state. The second flap 92 configures part of the second conveying path R2. The second flap 92 is configured so that the position of its distal end can be adjusted when driven by a motor (not shown).

The opening 7 is formed in the rear side of the printing unit 11. A rear accommodating unit 70 is disposed in the opening 7 and is capable of opening and closing. Sheets P of various sizes can be accommodated in the rear accommodating unit 70. The rear accommodating unit 70 rotates about a rotational shaft 72. As indicated by the arrows in FIG. 2, the rear accommodating unit 70 is displaceable between a closed state (depicted by dashed lines in FIG. 2) for closing the opening 7, and an open state (depicted by solid lines in FIG. 2) exposing the opening 7. When the rear accommodating unit 70 is in the open state, the interior space of the printing device 1 and the outside of the printing device 1 communicate with each other through the opening 7. That is, the opening 7 is in communication with the image-recording unit 3, and the image-recording unit 3 can be accessed through the opening 7.

A guide member 71 is provided on the rear accommodating unit 70 for guiding sheets P into the rear accommodating unit 70. The guide member 71 guides sheets P toward the rear accommodating unit 70 by rotating in association with the rear accommodating unit 70 while contacting the sheets P. The third feed roller 28 is provided in the rear accommodating unit 70. The third feed roller 28 functions to feed sheets P accommodated in the rear accommodating unit 70 onto the first conveying path R1.

A registration sensor 109 is provided on the first conveying path R1 upstream of the first conveying roller 60. The registration sensor 109 detects when the leading edge or trailing edge of the sheet P passes a point of contact with the first conveying roller 60. The registration sensor 109 may be a sensor provided with an actuator that pivots when contacted by a sheet P, a photosensor, or the like. The registration sensor 109 outputs an ON signal when the leading edge or trailing edge of a sheet P passes the contact point with the first conveying roller 60 and outputs an OFF signal when the leading edge or trailing edge of a sheet P is not passing the contact point with the first conveying roller 60. Detection signals from the registration sensor 109 are outputted to the controller 10.

An encoder 110 (see FIG. 3) is provided on the first conveying roller 60 for detecting the rotation of the first conveying roller 60. The encoder 110 outputs a pulse signal to the controller 10 according to the rotation of the first conveying roller 60. The encoder 110 has an encoder disc and an optical sensor. The encoder disc is rotatable in accordance with the rotation of the first conveying roller 60. The optical sensor is configured to generate a pulse signal while reading the rotating encoder disc, and to output the pulse signal to the controller 10.

As shown in FIG. 2, a residual quantity sensor 115 is provided in the second accommodating unit 22. The residual quantity sensor 115 is a photosensor, for example. The residual quantity sensor 115 detects the residual quantity of second sheets P2 accommodated in the second accommodating unit 22 and outputs a detection signal corresponding to the residual quantity to the controller 10 (see FIG. 3).

Figure 3:
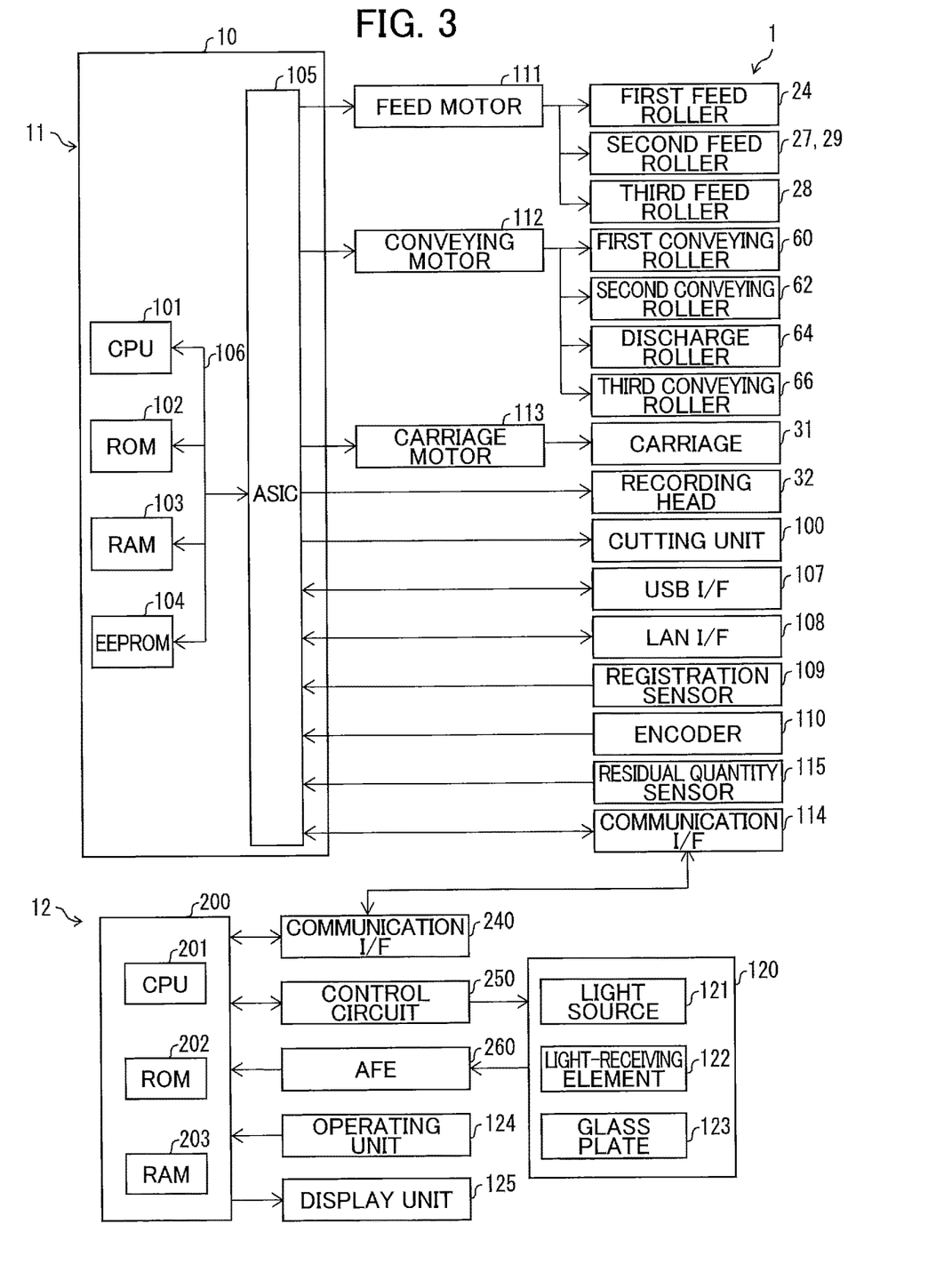
FIG. 3 is a block diagram illustrating an electrical configuration in the printing device according to the first embodiment.

FIG. 3 is a block diagram of the printing device 1 according to the first embodiment. As shown in FIG. 3, in addition to the components described above, the printing unit 11 of the printing device 1 includes the controller 10, a USB interface 107, a LAN interface 108, and a communication interface 114.

The controller 10 has a central processing unit (CPU) 101, a read-only memory (ROM) 102, a random-access memory (RAM) 103 as an example of the storage unit, an EEPROM (registered trademark) 104, and an application-specific integrated circuit (ASIC) 105, all of which components are interconnected via an internal bus 106. The ROM 102 stores programs and the like by which the CPU 101 controls various operations. The RAM 103 is used as a storage area for temporarily storing data, signals, and the like used when the CPU 101 executes the programs, or a work area for data processing. The EEPROM 104 stores settings information to be preserved when the power supply is off. Based on a control program read from the ROM 102, the controller 10 controls the feed motor 111, conveying motor 112, carriage motor 113, recording head 32, cutting unit 100, display unit 125, and the like.

The ASIC 105 is connected to the feed motor 111, conveying motor 112, carriage motor 113, recording head 32, cutting unit 100, USB interface 107, LAN interface 108, registration sensor 109, encoder 110, residual quantity sensor 115, and communication interface 114. The ASIC 105 supplies drive currents to the feed motor 111, conveying motor 112, and carriage motor 113. The feed motor 111, conveying motor 112, and carriage motor 113 are DC motors whose rotation speed increases when the ASIC 105 supplies a higher drive current and decreases when the ASIC 105 supplies a lower drive current. The encoder 110 controls the feed motor 111, conveying motor 112, and carriage motor 113 through pulse width modulation (PWM) control, for example.

The controller 10 also applies drive voltages to vibrating elements in the recording head 32 to eject ink droplets from nozzles provided in the recording head 32. The ASIC 105 is also connected to the registration sensor 109, encoder 110, and residual quantity sensor 115. The controller 10 detects the state of the printing unit 11 in the printing device 1 based on signals outputted from the registration sensor 109, encoder 110, and residual quantity sensor 115.

Specifically, the controller 10 detects when a sheet P or second sheet P2 pass the contact point with the first conveying roller 60 based on the detection signal outputted from the registration sensor 109. The controller 10 detects the rotated amount of the first conveying roller 60 based on pulse signals outputted from the encoder 110. The controller 10 estimates the conveyance amount of the sheet P or the second sheet P2 on the first conveying path R1 (equivalent to L1 in FIG. 4) based on pulse signals outputted from the encoder 110 after a registration sensor 109 outputted an ON signal. The controller 10 also detects the residual quantity of second sheets P2 in the second accommodating unit 22 based on a detection signal outputted from the residual quantity sensor 115.

A USB memory or a USB cable may be connected to the USB interface 107. When USB memory is connected to the USB interface 107, the controller 10 can receive image data stored in the USB memory via the USB interface 107. If a USB cable is connected to the USB interface 107, the USB interface 107 can receive a print job from a personal computer (PC) connected to the other end of the USB cable. Similarly, if a LAN cable is connected to the LAN interface 108, the controller 10 can receive a print command from a PC connected to the LAN interface 108. Note that, although the USB interface 107 and LAN interface 108 are used as examples in the embodiment, print jobs may also be received through wireless communication.

Upon receiving a print job (print command) via the USB interface 107 or LAN interface 108, the controller 10 controls the components of the printing unit 11 to record an image corresponding to the print command on sheets P. The communication interface 114 of the printing unit 11 is also electrically connected to a communication interface 240 of the image-reading unit 12. The controller 10 receives scan data for sheets P that have been read by the image-reading unit 12 via the communication interface 114.

<Image-Reading Unit>

As shown in FIGS. 1 and 2, the image-reading unit 12 is arranged on top of the printing unit 11. The image-reading unit 12 functions to read images recorded on sheets P or originals (not shown), for example. As shown in FIG. 3, the image-reading unit 12 has a sensor unit 120, a controller 200, a communication interface 240, a control circuit 250, an analog front-end (AFE) 260, an operating unit 124, and a display unit 125. The sensor unit 120 has a light source 121, a light-receiving element 122, and a glass plate 123. The controller 200 has a CPU 201, a ROM 202, and a RAM 203.

The light source 121 of the sensor unit 120 is configured of light-emitting diodes or the like. The glass plate 123 is a clear plate-like member. The light source 121 emits light toward a sheet P, original, or the like placed on the glass plate 123. The light-receiving element 122 has a plurality of light-receiving elements. A white reference plate (not shown) is disposed in a position opposing the light-receiving element 122 from above. When the light source 121 irradiates light onto the sheet P, original, or the like, the light-receiving element 122 receives light reflected off the white reference plate.

Various programs for controlling operations of the image-reading unit 12 are stored in the ROM 202. Based on programs read from the ROM 202, the CPU 201 controls components of the image-reading unit 12 to execute an image-reading process.

The control circuit 250 is connected to the sensor unit 120. The control circuit 250 transmits signals to the sensor unit 120 for switching on and off lighting from the light source 121 and for controlling a current value I of current supplied to the light source 121 based on commands from the CPU 201. The control circuit 250 also transmits a timing control signal to the sensor unit 120 for controlling the light-receiving timing of the light-receiving element 122. Upon receiving a signal from the control circuit 250, the sensor unit 120 lights the light source 121, receives reflected light with the light-receiving element 122, and outputs scan data to the AFE 260 in the form of an analog signal corresponding to the quantity of light received by the light-receiving element 122.

The AFE 260 is connected to the sensor unit 120. The AFE 260 has an analog-digital converter (AD converter). The AFE 260 converts scan data in the form of analog signals outputted from the sensor unit 120 to scan data in the form of digital signals that constitute gradation data. The AFE 260 has a predefined input range and resolution (for example, 8-bit resolution with gradations from 0 to 255). The AFE 260 performs A-D conversion on scan data. Scan data converted by the AFE 260 is stored in the RAM 203.

A conveying unit (not shown) is provided in the image-reading unit 12. The conveying unit has conveying rollers, a conveying motor, and the like not shown in the drawings. The conveying unit functions to convey sheets P, originals, or the like on which images are formed. The CPU 201 drives the conveying motor to rotate the conveying rollers, and the conveying rollers convey sheets P in the image-reading unit 12.

The operating unit 124 includes a touchscreen, for example. By performing touch operations on the touchscreen, the user can perform various settings for printing. For example, by operating the operating unit 124, the user can set the size for second sheets P2 to be conveyed to the second accommodating unit 22 and can set the priority for using sheets P accommodated in the first accommodating unit 21 or second sheets P2 accommodated in the second accommodating unit 22.

The communication interface 240 is connected to the communication interface 114 and enables the image-reading unit 12 and printing unit 11 to perform data communications and exchange process requests. The display unit 125 has a liquid crystal display, for example, for displaying various printing-related screens. For example, information may be displayed on the display unit 125 to indicate the size of the second sheet P2, the residual quantity of second sheets P2, and the like.

<Control Process of the Printing Device>

Figure 5:
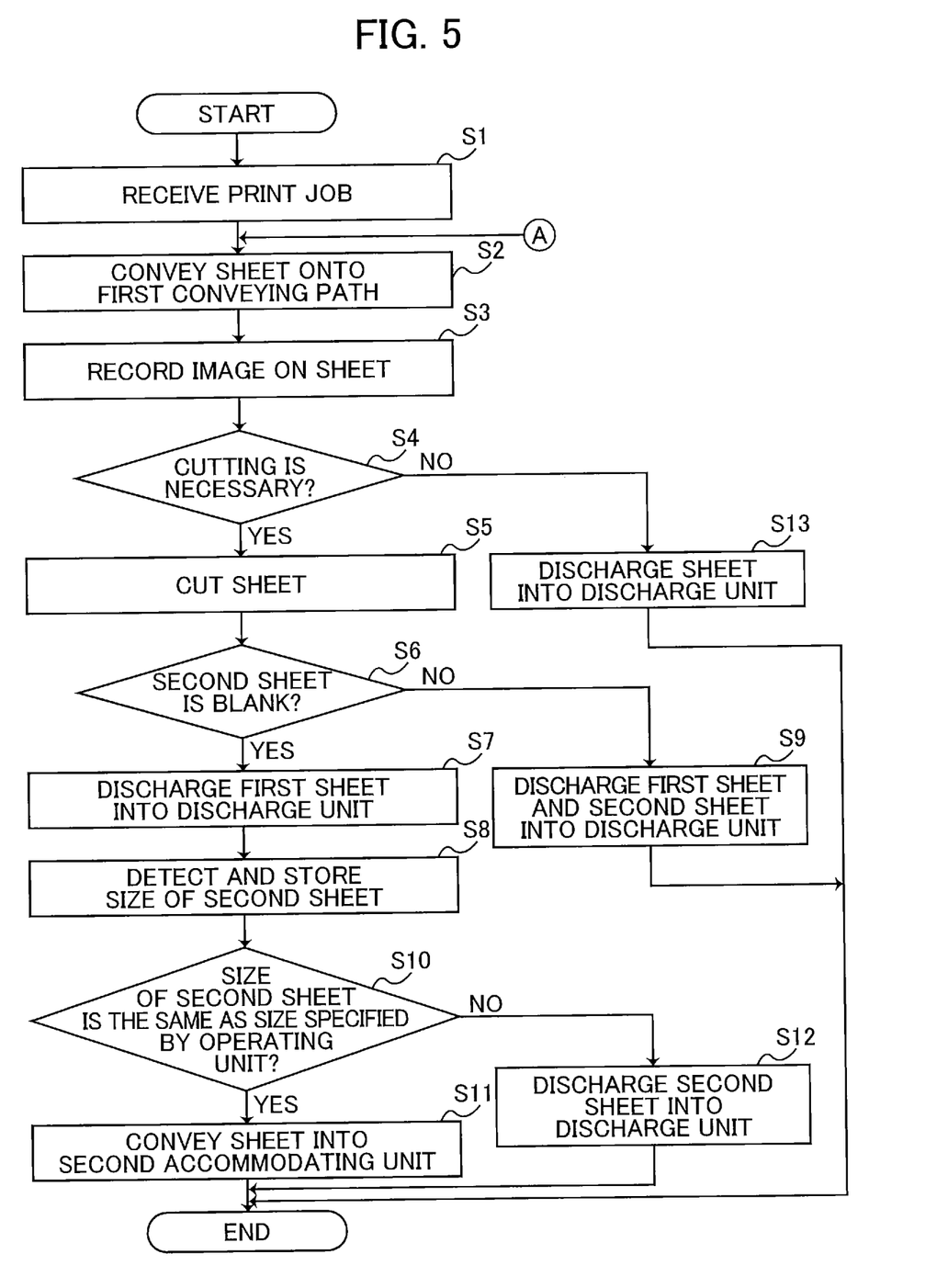
FIG. 5 is a flowchart illustrating steps in a printing process executed by a CPU in the printing device according to the first embodiment.
Figure 6:
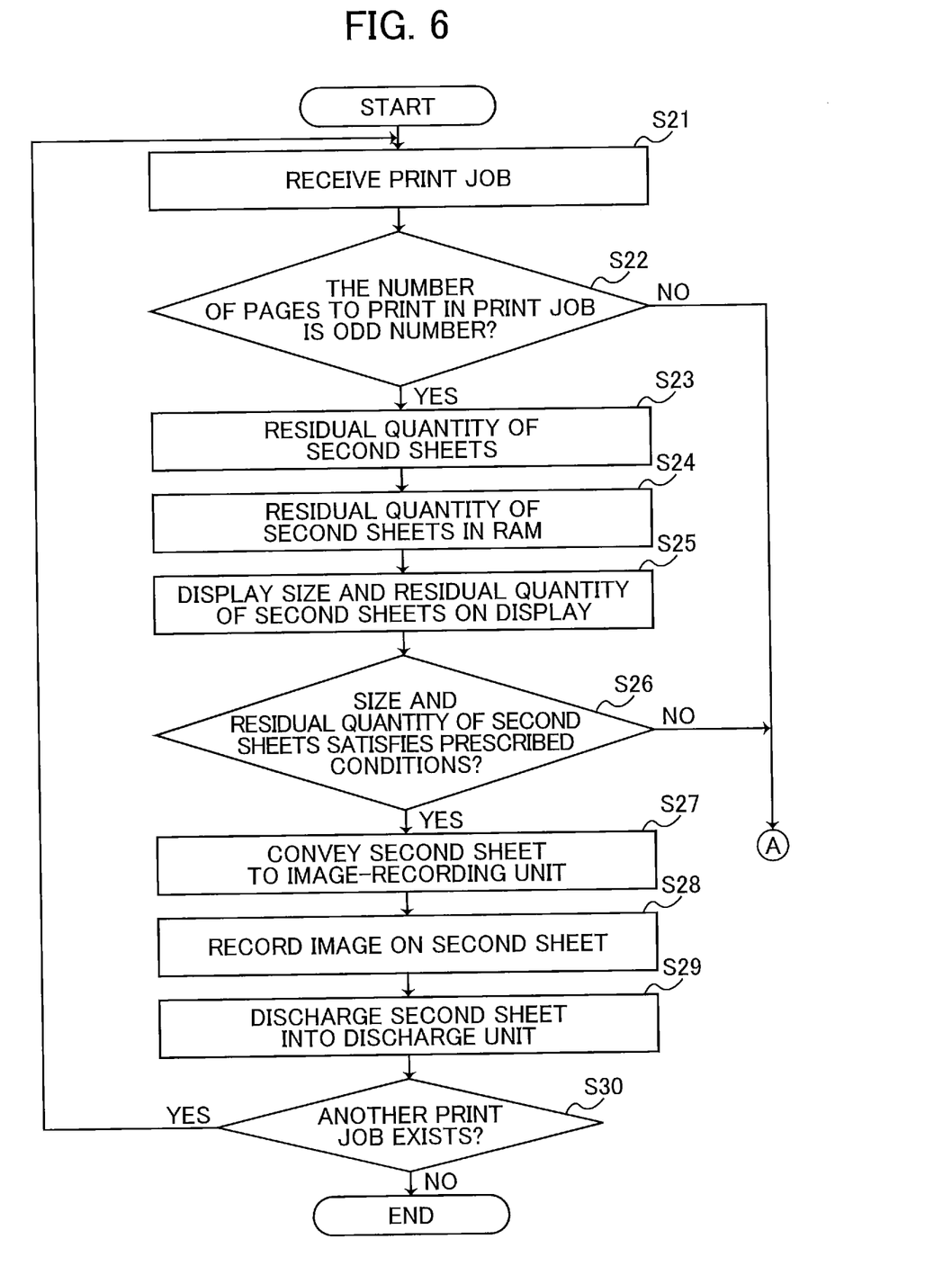
FIG. 6 is a flowchart illustrating steps subsequent to the steps in FIG. 5.

Next, steps in a print control process executed by the printing device 1 according to the first embodiment will be described with reference to the flowcharts in FIGS. 5 and 6. FIG. 6 is a continuation of the process in FIG. 5. Note that the flowcharts in FIGS. 5 and 6 are merely one example, and the present invention is not limited to this process.

In the following description for the flowchart in FIG. 5, it will be assumed that the second accommodating unit 22 accommodates no second sheets P2 in its initial condition. In S1 at the beginning of the process in FIG. 5, the controller 10 receives a print job via the USB interface 107 or LAN interface 108. After the print job is received, in S2 the controller 10 drives the printing unit 11 to rotate the first feed roller 24 forward in order to convey a sheet P from the first accommodating unit 21 onto the first conveying path R1 When the leading edge of the sheet P contacts the first flap 91, the first flap 91 is rotated from the second state (depicted with solid lines in FIG. 2) in which the first flap 91 has been maintained by the coil spring urging the first flap 91 downward to the first state (depicted with dashed lines in FIG. 2) owing to the pressure from the sheet P. After the sheet P has passed, the first flap 91 is rotated back to the second state by the urging force of the coil spring.

Next, when the leading edge of the sheet P conveyed along the first conveying path R1 reaches the first conveying roller 60, the controller 10 drives the conveying motor 112 in a forward rotation so as to rotate the first conveying roller 60, second conveying roller 62, and discharge roller 64 forward and convey the leading edge side of the sheet P toward the image-recording unit 3. Note that the controller 10 determines whether the leading edge of the sheet P has reached the first conveying roller 60 by detecting when the rotated amount of the first feed roller 24 has reached a prescribed amount required for conveying the sheet P from the first accommodating unit 21 to the first conveying roller 60. The controller 10 detects the rotated amount of the first feed roller 24 based on pulse signals inputted from an encoder (not shown) provided on the first feed roller 24.

In S3 the controller 10 executes an image-recording process to record an image on the sheet P. In the image-recording process, the controller 10 repeatedly alternates between executing a line feed process and a recording process on the sheet P that has been conveyed to the image-recording unit 3. In the line feed process, the controller 10 drives the first conveying roller 60, second conveying roller 62, and discharge roller 64 by rotating the conveying motor 112 forward in order to convey the sheet P a prescribed feed amount in the first conveying direction. In the recording process, the controller 10 drives the carriage motor 113 while the sheet P is in a stationary state and records one line of the image by ejecting ink droplets onto the sheet P from the nozzles in the recording head 32.

In S4 the controller 10 determines whether cutting the sheet P is required. When the size of the print data specified in the print job (A5, for example) is smaller than the size of the sheet P accommodated in the first accommodating unit 21 (A4, for example), the controller 10 determines that cutting of the sheet P is required.

When the controller 10 determines that the sheet P must be cut (S4: YES), in S5 the controller 10 drives the cutting unit 100 to cut the sheet P. In the example of FIG. 4, the cutting unit 100 cuts the sheet P along the width direction to form a first sheet P1 and a second sheet P2 that are one-half the size of the sheet P. Note that although the sheet P is cut in half in the example of FIG. 4, the sheet P may be cut to one-third the original size instead, for example. The cutting position on the sheet P may be adjusted according to the sheet size specified in the print data.

If an image is not recorded on the second sheet P2, the blank second sheet P2 can be reused. Hence, in S6 the controller 10 determines whether the second sheet P2 is blank. If the second sheet P2 is blank (S6: YES), in S7 the controller 10 rotates the discharge roller 64 forward by controlling the conveying motor 112 in order to discharge the first sheet P1 into the discharge unit 23, and subsequently in S8 the controller 10 detects the size of the second sheet P2 and stores data of the size of the second sheet P2 in the RAM 103. On the other hand, if an image was recorded on the second sheet P2, i.e., if the second sheet P2 is not blank (S6: NO), in S9 the controller 10 discharges the first sheet P1 and second sheet P2 having images recorded thereon into the discharge unit 23.

Here, an example method for detecting the size of the second sheet P2 will be described. As shown in FIG. 4, The size of a second sheet P2 is defined by a length L2 in the conveying direction and a width W2 in the width direction. The length L2 of the second sheet P2 is found by subtracting the length L1 of the first sheet P1 from the total length L of the sheet P (L2=L−L1), while the width W2 of the second sheet P2 is equivalent to the width W of the sheet P (W2=W).

Here, the length L and width W of the sheet P are defined by standard sizes. For example, if the size of the sheet P is the A4 size, then L=297 mm and W=210 mm. On the other hand, the length L1 of the first sheet P1 is determined by the size of print data specified in the print job. The length L1 of the sheet P is found based on pulse signals outputted from the encoder 110 from the timing that the registration sensor 109 detects the leading edge of the sheet P to the timing that the image-recording unit 3 completes image recording. This enables the controller 10 to detect the size of the second sheet P2. In this way, the registration sensor 109 and encoder 110 fulfill the function of a printing medium sensor that detects the size of the second sheet P2.

After completing S8, in S10 the controller 10 determines whether the size of the second sheet P2 is the same as a size the user has specified through operations on the operating unit 124. If the size of the second sheet P2 is equivalent to the specified size (S10: YES), in S11 the controller 10 controls the conveying motor 112 to convey the second sheet P2 into the second accommodating unit 22. Specifically, the controller 10 rotates the first conveying roller 60, second conveying roller 62, and third conveying roller 66 in reverse by controlling the conveying motor 112 so that the second sheet P2 is conveyed in a second conveying direction, i.e., a direction from the front toward the upper-rear of the printing unit 11, and conveys the second sheet P2 into the second accommodating unit 22. Since the first flap 91 is in the second state (depicted with solid lines in FIG. 2) at this time, the second sheet P2 is conveyed along the top surface of the first flap 91 toward the second flap 92. The controller 10 also adjusts the position of the distal end of the second flap 92 by controlling the motor of the second flap 92 in order to guide the second sheet P2 toward the third conveying roller 66.

On the other hand, if the size of the second sheet P2 differs from the specified size (S10: NO), in S12 the controller 10 discharges the second sheet P2 into the discharge unit 23. Specifically, the controller 10 rotates the first conveying roller 60, second conveying roller 62, and discharge roller 64 forward by controlling the conveying motor 112, thereby conveying the second sheet P2 in the first conveying direction and discharging the second sheet P2 into the discharge unit 23.

If the controller 10 determines in S4 that cutting of the sheet P is unnecessary (S4: NO), in S13 the controller 10 controls the conveying motor 112 to rotate the first conveying roller 60, second conveying roller 62, and discharge roller 64 forward in order to convey the sheet P in the first conveying direction without cutting and to discharge the sheet P into the discharge unit 23. Note that, when the number of pages to print in the print job is more than one (1), the controller 10 returns to S2 and repeats execution of the processes from S2 until all the pages are printed. After completing the steps in the flowchart of FIG. 5, that is, completing printing of all the pages specified in the print job, the process advances to the flowchart in FIG. 6.

In S21 of the flowchart in FIG. 6, the controller 10 receives the next print job via the USB interface 107 or LAN interface 108 and in S22 determines whether the number of pages to print in the next print job is an odd number. If the number of pages to print is odd (S22: YES), in S23 the controller 10 detects the residual quantity of second sheets P2 as described above. In S24 the controller 10 stores residual quantity of the second sheets P2 in the RAM 103. However, if the number of pages to print is an even number (S22: NO), the controller 10 returns to S2 in FIG. 5 and conveys a sheet P from the first accommodating unit 21 onto the first conveying path RE This is because when the number of pages to print is an even number, it is more efficient to print using uncut sheets P than using cut second sheets P2.

After completing S24 in FIG. 6, in S25 the controller 10 displays the size and residual quantity of second sheets P2 on the display unit 125. In S26 the controller 10 determines whether the size and residual quantity of second sheets P2 satisfies prescribed conditions.

The prescribed conditions used at this time may be that: (1) the size of second sheets P2 is greater than or equal to the size of print data specified in the print job, (2) the residual quantity of second sheets P2 is greater than or equal to the number of pages to print in the current print job, and (3) the length L2 of second sheets P2 in the conveying direction is greater than or equal to the distance between the first conveying roller 60 and second conveying roller 62 and the distance between the first conveying roller 60 and third conveying roller 66.

If the size and residual quantity of second sheets P2 satisfy the prescribed conditions (S26: YES), in S27 the controller 10 conveys a second sheet P2 to the image-recording unit 3. Specifically, the controller 10 controls the feed motor 111 to rotate the second feed roller 27 forward in order to convey a second sheet P2 from the second accommodating unit 22 onto the second conveying path R2. Next, the controller 10 controls the feed motor 111 to rotate the third conveying roller 66 and first conveying roller 60 forward in order to convey the second sheet P2 to the image-recording unit 3 along the second conveying path R2.

On the other hand, if the size and residual quantity of the second sheets P2 do not satisfy the prescribed conditions (S26: NO), the controller 10 returns to S2 of FIG. 5. In other words, when the size of the second sheets P2 is smaller than the size of the print data specified in the print job or when the residual quantity of second sheets P2 is smaller than the number of pages to print in the current print job, in S2 the controller 10 conveys a sheet P from the first accommodating unit 21 onto the first conveying path R1.

After completing S27 of FIG. 6, in S28 the controller 10 executes the image-recording process described above on the second sheet P2 conveyed to the image-recording unit 3 to record an image on the second sheet P2. In S29 the controller 10 controls the conveying motor 112 to rotate the first conveying roller 60, second conveying roller 62, and discharge roller 64 forward in order to discharge the second sheet P2 into the discharge unit 23. Note that when the number of pages to print in the print job is more than one (1), the controller 10 repeatedly executes the process in S27-S29 until all the pages are printed.

In S30 the controller 10 determines whether another print job exists. If another print job does exist (S30: YES), the controller 10 returns to S21. However, if another print job does not exist (S30: NO), the controller 10 ends the process of FIG. 6.

<Advantages Obtained by the First Embodiment>

The printing device 1 according to the first embodiment described above is provided with the first accommodating unit 21 that accommodates sheets P, the first conveying path R1, along which sheets P are conveyed in the first conveying direction, the image-recording unit 3 disposed on the first conveying path R1 to record images on sheets P, the cutting unit 100 provided on the first conveying path R1 downstream of the image-recording unit 3 for cutting sheets P into first sheets P1 and second sheets P2, the second accommodating unit 22 that accommodates second sheets P2 obtained through cutting the sheets P by the cutting unit 100, and the second conveying path R2, along which second sheets P2 are conveyed in a second conveying direction different from the first conveying direction so as to be guided to the second accommodating unit 22. The second accommodating unit 22 has a length LC2 in the paper-conveying direction that is shorter than the length LC1 of the first accommodating unit 21 in the paper-conveying direction.

By providing the second accommodating unit 22 that is smaller than the first accommodating unit 21 according to the configuration described above, second sheets P2 obtained by cutting the sheets P can be conveyed into the second accommodating unit 22 for reuse, and the printing device 1 can be made more compact. That is, when the cutting unit 100 cuts a sheet P into a first sheet P1 and a second sheet P2, the second sheet P2 can be accommodated in the second accommodating unit 22 and can be used for printing subsequent print jobs, for example. A particular feature of this configuration is that the printing device 1 can be made smaller since the space occupied by the second accommodating unit 22 is smaller than the space occupied by the first accommodating unit 21.

Further, the vertical length LH2 of the second accommodating unit 22 is shorter than the vertical length LH1 of the first accommodating unit 21. With this configuration, the printing device 1 can be made more compact since the vertical length LH2 of the second accommodating unit 22 is smaller than the vertical length LH1 of the first accommodating unit 21.

Further, the second accommodating unit 22 is provided above the image-recording unit 3. This arrangement effectively utilizes the available interior space of the printing device 1 to provide the second accommodating unit 22 to achieve a more compact printing device 1.

The printing device 1 is further provided with the opening 7, while the image-recording unit 3 has the platen 33 for supporting sheets P. The platen 33 is disposed to be pivotally movable between a first position and a second position. When the platen 33 is in the second position, the image-recording unit 3 is accessible through the opening 7.

If a paper jam or the like occurs in the image-recording unit 3 having the above construction, the user can rotate the platen 33 downward to form a path leading from the opening 7 of the printing device 1 to the image-recording unit 3 and can use this path to extract the jammed paper.

The printing device 1 is also provided with the image-reading unit 12 for reading images recorded on sheets P. The second accommodating unit 22 is provided beneath the image-reading unit 12. In this configuration, the available internal space of the printing device 1 is used effectively for arranging the second accommodating unit 22, thereby enabling the printing device 1 to be made more compact.

The image-reading unit 12 also has the glass plate 123 for supporting a sheet P, the light source 121 that emits light onto a sheet P placed on the glass plate 123, and the light-receiving element 122 that receives light emitted from the light source 121 and reflected off the sheet P. The second accommodating unit 22 is arranged between the glass plate 123 and the image-recording unit 3.

With this configuration, the image-reading unit 12 can read images recorded on a sheet P. Further, since the image-reading unit 12 is disposed above the image-recording unit 3, the second accommodating unit 22 can be arranged in the space between the image-reading unit 12 and image-recording unit 3 to achieve a more compact printing device 1.

The second accommodating unit 22 is disposed at a position at least partly offset from the image-reading unit 12 in the paper-conveying direction. By arranging the second accommodating unit 22 at a position partly offset from the image-reading unit 12 in the paper-conveying direction (front-rear direction) in this configuration, the user can easily retrieve cut second sheets P2 from the second accommodating unit 22.

The second accommodating unit 22 is also arranged so as to protrude out from under the image-reading unit 12 in the paper-conveying direction. The second accommodating unit 22 has a cover 221 that can be opened to retrieve second sheets P2 from the second accommodating unit 22.

With this construction, the user can easily retrieve cut second sheets P2 from the second accommodating unit 22 by opening the cover 221 and can use these second sheets P2 as needed. Further, after second sheets P2 have been removed from the second accommodating unit 22 and used, the user can close the cover 221 to securely store remaining second sheets P2 in the second accommodating unit 22.

The first accommodating unit 21 also has the first placement part 210 that supports sheets P thereon. The second accommodating unit 22 has the second placement part 220 that supports second sheets P2 thereon. With this construction, sheets P can be supported in the first accommodating unit 21 while stabilized on the first placement part 210 and second sheets P2 can be supported in the second accommodating unit 22 while stabilized on the second placement part 220.

The printing device 1 is further provided with the controller 10, and the operating unit 124 for allowing a user to set the size of second sheets P2 desired to be conveyed to the second accommodating unit 22. The controller 10 is configured to control the motor to rotate the rollers to convey second sheets P2 to the second accommodating unit 22 when the second sheets P2 are the same size as the size set through the operating unit 124 and does not convey second sheets P2 to the second accommodating unit 22 when the size of the second sheets P2 differs from the specified size.

With the configuration described above, the user can operate the operating unit 124 to set the size of second sheets P2 desired to be accommodated in the second accommodating unit 22. In this way, the user can set the size of paper desired to be accommodated in the second accommodating unit 22 according to the user's needs.

Second Embodiment

Next, steps in a control process executed by the controller 10 of the printing device 1 according to a second embodiment of the present invention will be described with reference to FIG. 7. For convenience of description, members having the same function as members described in the first embodiment will be designated with the same reference numerals to avoid duplicating description.

<Control Process Executed by the Controller>

Figure 7:
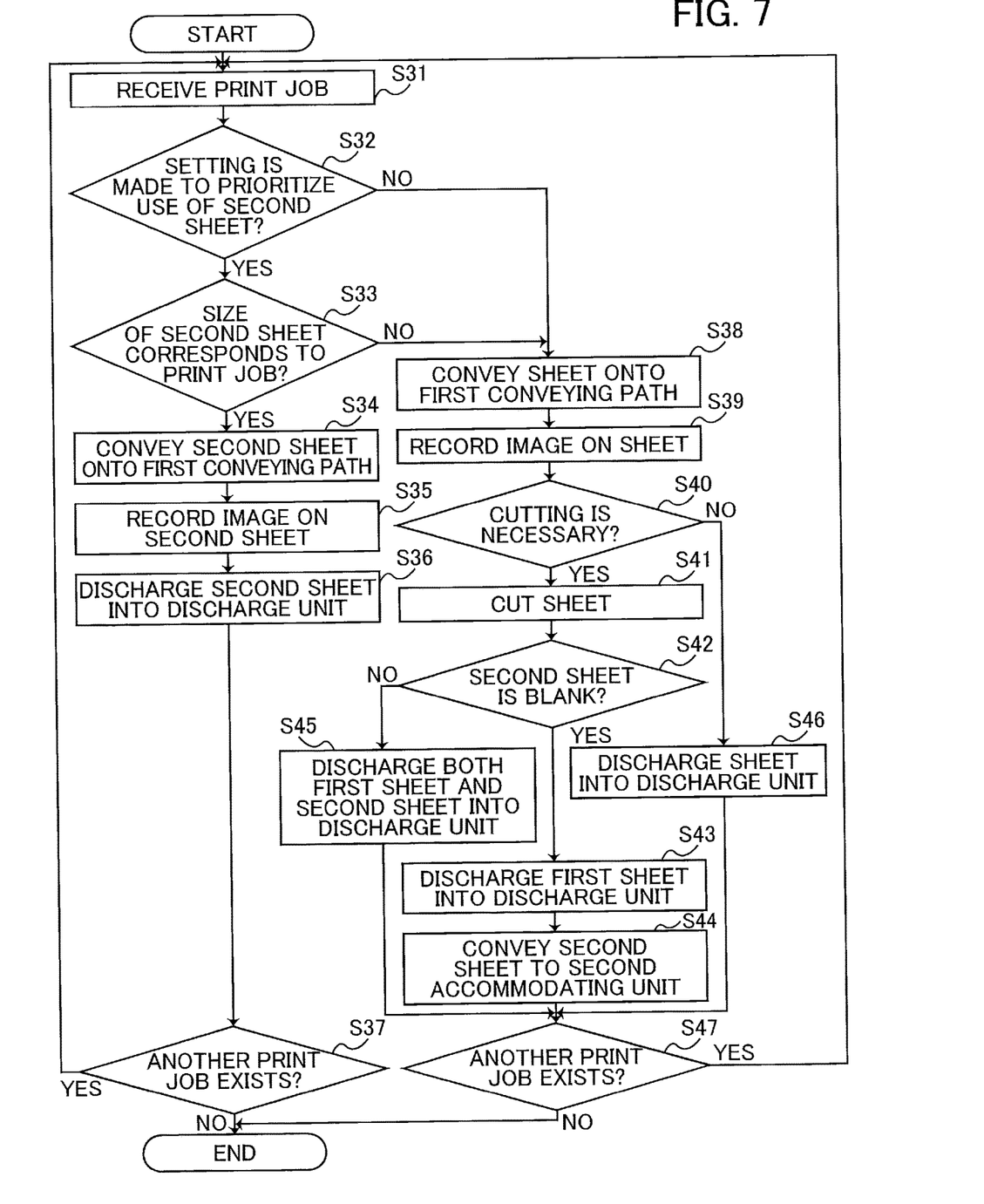
FIG. 7 is a flowchart illustrating steps in a printing process executed by the CPU in the printing device according to a second embodiment.

FIG. 7 is a flowchart illustrating steps in the control process performed on the printing device 1 according to the second embodiment. Note that the flowchart of FIG. 7 is merely one example and the present invention is not limited to this process.

In S31 of FIG. 7, the controller 10 first receives a print job via the USB interface 107 or LAN interface 108. Upon receiving a print job, in S32 the controller 10 determines whether a setting has been made to prioritize use of second sheets P2. If the option to prioritize second sheets P2 has been set (S32: YES), in S33 the controller 10 determines whether the size of the second sheets P2 accommodated in the second accommodating unit 22 corresponds to the print job.

Here, the size of the second sheets P2 is determined to correspond to the print job when the size of the second sheets P2 accommodated in the second accommodating unit 22 is greater than or equal to the size of print data specified in the print job. For example, if the second sheets P2 are A5 size, the controller 10 determines that the size of the second sheets P2 correspond to the print job when the size of the print data specified in the print job is A5. However, if the size of the second sheets P2 is A5 but the size of the print data specified in the print job is A4, the controller 10 determines that the size of the second sheets P2 does not correspond to the print job.

When the size of the second sheets P2 corresponds to the print job (S33: YES), in S34 the controller 10 conveys a second sheet P2 onto the first conveying path R1. Specifically, the controller 10 rotates the second feed roller 27 and third conveying roller 66 forward to convey a second sheet P2 from the second accommodating unit 22 onto the second conveying path R2 and thereafter onto the first conveying path R1.

In S35 the controller 10 executes the image-recording process described above to record an image on the second sheet P2, and in S36 discharges the second sheet P2 into the discharge unit 23. It is noted that when the number of pages to be printed in the print job is greater than one (1), the processes from S34-S36 are repeated until all the pages in the print job are printed. When all the pages in the print job are printed, the process proceeds to S37, in which the controller 10 determines whether another print job exists. When another print job exists (S37: YES), the controller 10 returns to S31. When another print job does not exist (S37: NO), the controller 10 ends the process in FIG. 7.

On the other hand, if the option to prioritize second sheets P2 has not been set (S32: NO) or if the size of the second sheets P2 does not correspond to the print job (S33: NO), in S38 the controller 10 conveys a sheet P onto the first conveying path R1 and in S39 executes the image-recording process to record an image on the sheet P.

In S40 the controller 10 determines whether the sheet P needs to be cut. If cutting is necessary (S40: YES), in S41 the controller 10 drives the cutting unit 100 to cut the sheet P into a first sheet P1 and a second sheet P2 (see FIG. 4). However, if cutting is not necessary (S40: NO), in S46 the controller 10 discharges the sheet P into the discharge unit 23.

After completing S41, in S42 the controller 10 determines whether the second sheet P2 is blank sheet. If the second sheet P2 is a blank sheet (S42: YES), in S43 the controller 10 discharges the first sheet P1 into the discharge unit 23 and in S44 conveys the second sheet P2 to the second accommodating unit 22. However, if an image was recorded on the second sheet P2, i.e., when the second sheet P2 is not blank (S42: NO), in S45 the controller 10 discharges both the first sheet P1 and second sheet P2 into the discharge unit 23. It is noted that when the number of pages to be printed in the print job is greater than one (1), the process returns from S46, S44, or S45 to S38 and the processes are repeated from S38 until all the pages in the print job are printed. When all the pages in the print job are printed, the process proceeds to S47, in which the controller 10 determines whether another print job exists. If another print job exists (S47: YES), the controller 10 returns to S31. If another print job does not exist (S47: NO), the controller 10 ends the process of FIG. 7.

In the second embodiment described above, the printing device 1 is further provided with the operating unit 124 for setting whether to prioritize sheets P accommodated in the first accommodating unit 21 or second sheets P2 accommodated in the second accommodating unit 22. The controller 10 is configured to control the printer unit 11 so that the printer unit 11 conveys one of the sheets P accommodated in the first accommodating unit 21 or second sheets P2 accommodated in the second accommodating unit 22 to the image-recording unit 3 for image recording according to which of the first sheets P1 and second sheets P2 has been prioritized based on the setting performed through the operating unit 124.

With the configuration described above, a user can set the size of second sheets P2 to be accommodated in the second accommodating unit 22 by operating the operating unit 124. Accordingly, the size of sheets accommodated in the second accommodating unit 22 can be set according to the user's needs.

The printing unit 11 of the printing device 1 is also provided with the registration sensor 109 and encoder 110 as paper medium sensors for detecting the size of the second sheets P2 to be accommodated in the second accommodating unit 22, and the residual quantity sensor 115 for detecting the residual quantity of second sheets P2 accommodated in the second accommodating unit 22. With this configuration, the controller 10 can learn the size and residual quantity of second sheets P2 accommodated in the second sheet P2.

The printing device 1 is also provided with the display unit 125. The controller 10 is configured to control the display unit 125 to display the size of second sheets P2 detected by the registration sensor 109 and encoder 110 and the residual quantity of second sheets P2 detected by the residual quantity sensor 115 on the display unit 125.

With this configuration, the user can quickly recognize the size and residual quantity of second sheets P2 in the second accommodating unit 22 by viewing the display unit 125.

The controller 10 also stores the size of the second sheets P2 detected by the registration sensor 109 and encoder 110 and the residual quantity of the second sheets P2 detected by the residual quantity sensor 115 in the RAM 103 (the storage unit). When the size and quantity of second sheets P2 stored in the RAM 103 meet prescribed conditions, the controller 10 gives priority to second sheets P2 accommodated in the second accommodating unit 22 over sheets accommodated in the first accommodating unit 21 when conveying a sheet to the image-recording unit 3.

With this configuration, the controller 10 can prioritize using second sheets P2 according to the size and residual quantity detected for second sheets P2 in the second accommodating unit 22, thereby effectively utilizing the second sheets P2.

Third Embodiment

Next, a printing device 1A according to a third embodiment of the present invention will be described with reference to FIG. 8, wherein like parts and components are designated with the same reference numerals to avoid duplicating description.

Figure 8:
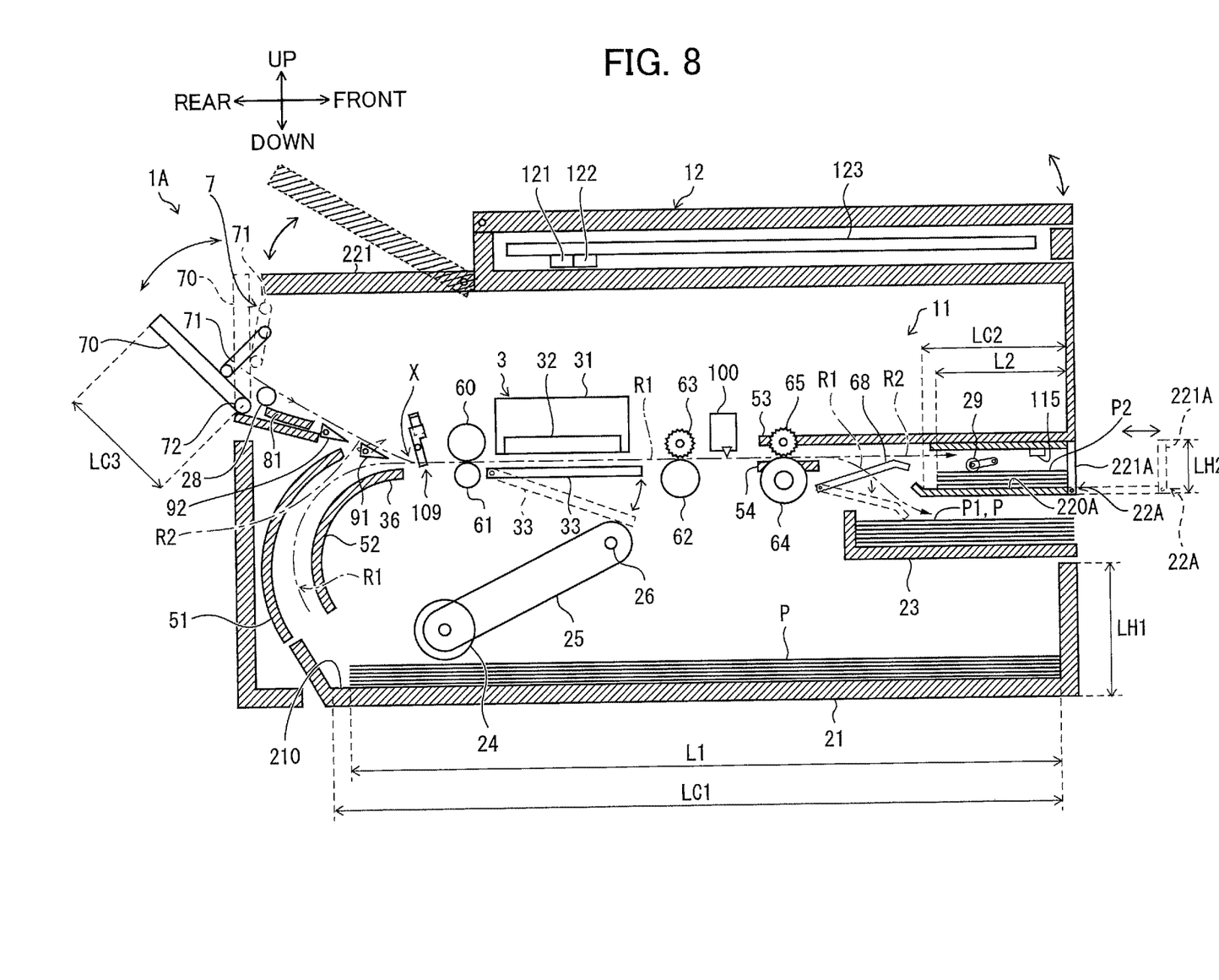
FIG. 8 is a cross-sectional view illustrating an internal configuration of the printing device according to a third embodiment.

FIG. 8 is a cross-sectional view showing the internal structure of the printing device 1A according to the third embodiment. As shown in FIG. 8, a second accommodating unit 22A is removably disposed above the front portion of the first accommodating unit 21, and specifically above the discharge unit 23. The second accommodating unit 22A is a case with an open rear side for accommodating second sheets P2. The second accommodating unit 22A has a second placement part 220A, and a cover 221A. A plurality of second sheets P2 can be supported on the second placement part 220A. The cover 221A is a transparent member that can be opened or closed. Since the cover 221A is transparent, the user can see the contents of the second accommodating unit 22A from outside the printing device 1A. By opening the cover 221A, the user can retrieve second sheets P2 from the second accommodating unit 22A.

The second accommodating unit 22A has a smaller size than the first accommodating unit 21. Specifically, assume that the length of the second accommodating unit 22 in the paper-conveying direction (the front-rear direction) is defined as a length LC2 and the length of the first accommodating unit 21 in the paper-conveying direction is defined as a length LC1, the length LC2 is shorter than the length LC1. Here, the length LC2 of the second accommodating unit 22A in the paper-conveying direction is the distance from the front wall to the rear wall of the second accommodating unit 22A. Additionally, a vertical length LH2 of the second accommodating unit 22A is set shorter than a vertical length LH1 of the first accommodating unit 21. The width (left-right dimension) of the second accommodating unit 22A is also set shorter than the width of the first accommodating unit 21.

A lever 68 is provided between the discharge roller 64 and discharge unit 23. The lever 68 can be pivoted up and down when driven by the controller 10. When the lever 68 is pivoted to its upward position depicted with solid lines in FIG. 8, a second sheet P2 cut by the cutting unit 100 and conveyed by the discharge roller 64 is subsequently guided along the top surface of the lever 68 into the second accommodating unit 22A. When the lever 68 is pivoted to its downward position depicted with dashed lines in FIG. 8, a sheet P or first sheet P1 having just undergone image recording by the image-recording unit 3 is guided along the top surface of the lever 68 and discharged into the discharge unit 23.

A second feed roller 29 is disposed in the second accommodating unit 22A. The feed motor 111 (see FIG. 3) drives the second feed roller 29 to rotate forward. By rotating forward, the second feed roller 29 conveys the second sheets P2 accommodated in the second accommodating unit 22A onto the first conveying path R1 one sheet at a time. Thereafter, the controller 10 rotates the discharge roller 64, second conveying roller 62, and first conveying roller 60 in reverse to convey the second sheet P2 to the merging position X. Subsequently, the controller 10 rotates the first conveying roller 60, second conveying roller 62, and discharge roller 64 forward to record an image on the second sheet P2 with the image-recording unit 3.

As depicted with dashed lines in FIG. 8, the length of the second accommodating unit 22A in the front-rear direction can be adjusted by sliding the bottom portion of the second accommodating unit 22A in the front-rear direction. Further, while not shown in the drawings, the second accommodating unit 22A can be removed and remounted at a prescribed position in the first accommodating unit 21. Once the second accommodating unit 22 has been remounted in the prescribed position of the first accommodating unit 21 in this way, the first feed roller 24 can be rotated forward to feed a second sheet P2 from the second accommodating unit 22A onto the first conveying path R1.

Since the printing device 1A according to the third embodiment described above is provided with a second accommodating unit 22A that is smaller than the first accommodating unit 21, cut second sheets P2 can be conveyed to the second accommodating unit 22A for reuse, and the printing device 1A can be made more compact. Specifically, since the second accommodating unit 22A is provided above the front portion of the first accommodating unit 21, the user can open the cover 221A from the front side of the printing device 1A to easily retrieve second sheets P2 from the second accommodating unit 22A. Further, since the cover 221A is a transparent member, the user can easily see the second sheets P2 accommodated in the second accommodating unit 22A.

Further, the second accommodating unit 22 is also configured so that its length in the front-rear direction is adjustable by sliding the second accommodating unit 22A in the front-rear direction, as depicted with dashed lines in FIG. 8. Accordingly, the user can adjust the front-rear length of the second accommodating unit 22A to suit the front-rear length of the cut second sheets P2.

Further, the second accommodating unit 22A is smaller in size than the first accommodating unit 21 and may be detachably disposed in the first accommodating unit 21. Accordingly, the second accommodating unit 22A accommodating second sheets P2 can be removed from its original location and remounted at a prescribed position in the first accommodating unit 21. Through this operation, the second sheets P2 accommodated in the second accommodating unit 22A can be fed onto the first conveying path R1 and conveyed to the image-recording unit 3 so that the image-recording unit 3 can record images on the second sheets P2.

OTHER EMBODIMENTS

While the second accommodating unit 22 is disposed between the glass plate 123 and image-recording unit 3 in the printing device 1 according to the first embodiment described above, the position of the second accommodating unit 22 is not limited to this layout. For example, a second accommodating unit may be provided in the rear surface side of the printing unit 11 in place of the rear accommodating unit 70. With this configuration, in S9 of FIG. 5 the controller 10 can control the motor (not shown) for adjusting the distal end position of the second flap 92 in order to guide second sheets P2 into the second accommodating unit 22. The length of the second accommodating unit in the paper-conveying direction is equivalent to the LC3 shown in FIG. 2.

In the printing device 1 according to the first embodiment described above, roller members (the first conveying roller 60, the second conveying roller 62, and the discharge roller 64) are used to convey the sheets P, but the sheets P may also be conveyed by a belt member, a drum member, or the like. The image-reading unit 12 may be provided with a conveying unit such as an Auto Document Feeder (ADF) for conveying the sheets P.

While the description has been made in detail with reference to specific embodiment(s) thereof, it would be apparent to those skilled in the art that various changes and modifications may be made therein without departing from the spirit and scope of the above described embodiment(s).

What is claimed is:

1. A printing device comprising:
   a first accommodating unit configured to accommodate a printing medium therein;
   a first conveying path, along which the printing medium is conveyed in a first conveying direction;
   an image-recording unit disposed along the first conveying path and configured to record an image on the printing medium;
   a cutting unit configured to cut the printing medium to separate the printing medium into a first printing medium and a second printing medium;
   a second accommodating unit configured to accommodate therein the second printing medium which is produced by cutting the printing medium by the cutting unit, a length of the second accommodating unit in a printing medium conveying direction being shorter than a length of the first accommodating unit in the printing medium conveying direction; a second conveying path, along which the second printing medium is conveyed to the second accommodating unit in a second conveying direction that is different from the first conveying direction; and a conveying unit configured to convey, to the image-recording unit, a selected one of the printing medium accommodated in the first accommodating unit and the second-printing medium accommodated in the second accommodating unit, the image-recording unit recording an image on the second-printing medium in a case where the second-printing medium is conveyed to the image-recording unit.

2. The printing device according to claim 1, wherein a length of the second accommodating unit in an up-down direction is shorter than a length of the first accommodating unit in the up-down direction.

3. The printing device according to claim 1, wherein the second accommodating unit is disposed above the image recording unit.

4. The printing device according to claim 3, further comprising a casing, in which the image-recording unit is provided, the casing being formed with an opening, an interior space of the casing and an outside of the casing communicating with each other through the opening, wherein the image recording unit includes a platen configured to support the printing medium thereon, the platen being arranged so as to be pivotably movable between a first position and a second position, and wherein, in a case where the platen is in the second position, a communication path is formed between the opening and part of the first conveying path opposing the image-recording unit for removing a printing medium jammed in the first conveying path.

5. The printing device according to claim 1, further comprising an image-reading unit configured to read image recorded on the printing medium, wherein the second accommodating unit is disposed beneath the image-reading unit.

6. The printing device according to claim 5, wherein the image-reading unit includes:

a glass plate configured to support the printing medium thereon;

a light source configured to emit light onto the printing medium placed on the glass plate; and a light-receiving element configured to receive light that is irradiated on the printing medium and is reflected off the printing medium, wherein the second accommodating unit is arranged between the glass plate and the image-recording unit.

7. The printing device according to claim 5, wherein the second accommodating unit is disposed at such a position that the second accommodating unit is at least partly offset from the image-reading unit in the printing medium conveying direction.

8. The printing device according to claim 7, wherein the second accommodating unit is arranged so as to protrude out from under the image-reading unit in the printing medium conveying direction, and wherein the second accommodating unit includes a cover configured to be opened to allow retrieval of the second printing medium from an inside of the second accommodating unit.

9. The printing device according to claim 1, wherein the second accommodating unit is disposed above a front portion of the first accommodating unit.

10. The printing device according to claim 9, wherein the second accommodating unit is smaller in size than the first accommodating unit, and is detachably disposed in the first accommodating unit.

11. The printing device according to claim 9, wherein the second accommodating unit is configured such that a length of the second accommodating unit in a front-rear direction is adjustable.

12. The printing device according to claim 1, wherein the first accommodating unit includes a first placement part configured to support the printing medium thereon, and wherein second accommodating unit includes a second placement part configured to support the second printing medium thereon.

13. The printing device according to claim 1, wherein the conveying unit is configured to further convey the second printing medium to the second accommodating unit, the printing device further comprising:
a controller;
and an operating unit configured to set the size of the second printing medium that should be conveyed to the second accommodating unit, wherein the controller is configured to control the conveying unit to convey the second printing medium to the second accommodating unit in a case where the second printing medium has a size the same as the size set by the operating unit, and not to convey the second printing medium to the second accommodating unit in a case where the size of the second printing medium has a size different from the size set by the operating unit.

14. The printing device according to claim 1, further comprising:
a controller;
and an operating unit configured to set which of the printing medium accommodated in the first accommodating unit and the second printing medium accommodated in the second accommodating unit should be prioritized, wherein the controller is configured to control, based on a result of setting by the operating unit, the conveying unit to convey, to the image-recording unit, one of the printing medium accommodated in the first accommodating unit and second printing medium accommodated in the second accommodating unit that is prioritized.

15. The printing device according to claim 1, further comprising:

a printing medium sensor configured to detect the size of the second printing medium accommodated in the second accommodating unit; and a residual quantity sensor configured to detect the residual quantity of the second printing medium accommodated in the second accommodating unit.

16. The printing device according to claim 15, further comprising:

a display unit; and a controller configured to control the display unit to display both of data of the size of the second printing medium detected by the printing medium sensor and data of the residual quantity of the second printing medium detected by the residual quantity sensor.

17. The printing device according to claim 15, further comprising:
a controller;

and
a storage unit,
wherein the controller stores, in the storage unit, data of the size of the second printing medium detected by the printing medium sensor, and data of the residual quantity of the second printing medium detected by the residual quantity sensor, and
wherein, in a case where the size and quantity of the second printing medium stored in the storage unit meet prescribed conditions, the controller gives priority to the second printing medium accommodated in the second accommodating unit over the printing medium accommodated in the first accommodating unit, and controls the conveying unit to convey the second printing medium from the second accommodating unit to the image-recording unit.

18. A printing device comprising:
a first accommodating unit configured to accommodate a printing medium therein;
a first conveying path, along which the printing medium is conveyed in a first conveying direction;
an image-recording unit disposed along the first conveying path and configured to record an image on the printing medium;
a cutting unit configured to cut the printing medium to separate the printing medium into a first printing medium and a second printing medium;
a second accommodating unit configured to accommodate therein the second printing medium which is produced by cutting the printing medium by the cutting unit, a length of the second accommodating unit in a printing medium conveying direction being shorter than a length of the first accommodating unit in the printing medium conveying direction, wherein the second accommodating unit is disposed above a front portion of the first accommodating unit, and wherein the second accommodating unit is configured such that a length of the second accommodating unit in a front-rear direction is adjustable; and
a second conveying path, along which the second printing medium is conveyed to the second accommodating unit in a second conveying direction that is different from the first conveying direction.

19. A printing device comprising:
a first accommodating unit configured to accommodate a printing medium therein;
a first conveying path, along which the printing medium is conveyed in a first conveying direction;
an image-recording unit disposed along the first conveying path and configured to record an image on the printing medium;
a cutting unit configured to cut the printing medium to separate the printing medium into a first printing medium and a second printing medium;
a second accommodating unit configured to accommodate therein the second printing medium which is produced by cutting the printing medium by the cutting unit, a length of the second accommodating unit in a printing medium conveying direction being shorter than a length of the first accommodating unit in the printing medium conveying direction;
a second conveying path, along which the second printing medium is conveyed to the second accommodating unit in a second conveying direction that is different from the first conveying direction;
a controller;
a conveying unit configured to convey the printing medium from the first accommodating unit to the image recording unit along the first conveying path and convey the second printing medium from the second accommodating unit to the image recording unit along the first conveying path; and
an operating unit configured to set which of the printing medium accommodated in the first accommodating unit and the second printing medium accommodated in the second accommodating unit is prioritized,
wherein the controller is configured to control, based on a result of setting by the operating unit, the conveying unit to convey, to the image-recording unit, one of the printing medium accommodated in the first accommodating unit and second printing medium accommodated in the second accommodating unit that is prioritized.

* * * * *